United States Patent

Schulze et al.

[11] 4,009,558
[45] Mar. 1, 1977

[54] CROP-FEED ARRANGEMENT FOR HAY BALER

[75] Inventors: Rudolf Schulze, Neustadt; Horst Schumacher, Langburkersdorf; Ferdinand Simora, Bonnewitz, all of Germany

[73] Assignee: VEB Kombinat Fortschritt, Neustadt in Sachsen, Germany

[22] Filed: July 17, 1974

[21] Appl. No.: 489,171

Related U.S. Application Data

[62] Division of Ser. No. 339,185, Aug. 3, 1973, Pat. No. 3,939,630.

[52] U.S. Cl. .................................. 56/341; 100/189
[51] Int. Cl.² ........................................ A01D 39/00
[58] Field of Search ..................... 56/341–345; 198/107; 100/142, 189

[56] References Cited

UNITED STATES PATENTS

| | | | |
|---|---|---|---|
| 2,725,009 | 11/1955 | Bornzin | 100/189 |
| 2,909,887 | 10/1959 | Claas | 56/341 |
| 2,950,670 | 8/1960 | Nolt et al. | 100/142 |
| 2,950,807 | 8/1960 | McDuffie | 198/107 |
| 3,464,347 | 9/1969 | Morris | 100/189 |

FOREIGN PATENTS OR APPLICATIONS

| | | | |
|---|---|---|---|
| 226,532 | 3/1963 | Austria | 56/341 |

*Primary Examiner* — Russell R. Kinsey
*Attorney, Agent, or Firm* — Karl F. Ross; Herbert Dubno

[57] ABSTRACT

A crop-feed arrangement for a hay baler displaced along a swath is provided with a pickup drum whose tines elevate the crop material from the ground and dispose it in a trough extending transversely of the direction of advance of the baler. An auxiliary feed device is provided above the pickup drum and is angularly oscillatable, while being provided with independently elastically suspended pushers, for feeding the crop material into the trough in which a transverse-feed mechanism, e.g. a fork describing a kidney-shaped pattern of motion advances the crop material into the lateral opening of the press channel. The ram compacts the crop material in this channel which extends in the travel direction, whereupon the bale is tied and the finished bale ejected at the rearward end of the channel.

5 Claims, 10 Drawing Figures

CROP-FEED ARRANGEMENT FOR HAY BALER

CROSS REFERENCE TO RELATED APPLICATION

This application is a division of my application Ser. No. 339,185 filed Aug. 3, 1973 now U.S. Pat. No. 3,939,630.

FIELD OF THE INVENTION

The present invention relates to crop-material feed arrangement for a baler and, more particularly, to a baler for crop materials, such as hay, having a pickup drum and a press channel extending transversely to one another.

BACKGROUND OF THE INVENTION

A hay baler or a baler for other crop materials generally comprises a vehicle structure or housing movable in a direction of advance along a swath of mown crop material which has previously been raked or tedded to form hay or which may be displaced across a field to pick up crop material such as straw discharged from a reaper, combine or the like.

Conventional hay balers may have a press channel extending in the direction of travel of the vehicle and provided with a ram or plunger adapted to compact crop material feed in this channel into a bale of a standard size. When the compacted material has reached this size, needles or other tying means knot a twine or wire about the compacted mass to form the bale which, as a further mass of crop material is advanced through the press channel, is ejected in the rearward discharge end of the channel. Since the ram and tying mechanism operate substantially periodically or intermittently, a transverse-feed mechanism may be provided to introduce crop material into a lateral opening of the baling channel in a retracted position of the ram. After this mechanism has moved out of the path of the ram, the latter becomes effective to compact the freshly introduced crop material against the previously formed bale. The transverse-feed mechanism thus operates synchronously with, but in phase-shifted relationship to, the press ram and both may be provided with a common drive.

The transverse-feed mechanism may include a trough or the like extending transversely of the press channel and, therefore, generally transverse to the direction of movement of the baler travel direction and may be provided with a feed fork or the like describing an elliptical or kidney-shaped motion whereby the fork sweeps close to the bottom of the trough in the direction of the press channel, elevates its tines at the end of their travel ends to lift the crop material into the press channel through the aforementioned lateral opening and then retracts rearwardly at some distance above the floor of the trough so that crop material can continuously feed into the trough during the feed and return strokes of the mechanism.

Various systems have been provided to pick up the crop material and the system of concern to the present invention makes use of a pickup drum rotatable about a substantially horizontal axis transverse to the press channel, parallel to the transverse-feed trough and perpendicular to the direction of displacement of the baler. The drum, which may extend over the full throat of the machine, may be provided with radially or secantially projecting tines, tongues or fingers which engage the crop material and lift it over the drum and into the transverse-feed trough.

Experience has shown that such systems are not always satisfactory because the crop material may fall back along the rising surface of the drum and delivered irregularly to the trough. Consequently, it has been proposed to provide an auxiliary mechanism in the region of the drum, e.g. above the latter, and including rotary tines or the like to assist in feeding the material into the transverse feed trough. The auxiliary mechanism may include a further drum having an array of tines, tongues or fingers, rotatable about an axis parallel to the axis of the pickup drum and describing a circular motion with the projecting members being effective only at their lowermost position of the circular orbit to engage the crop material. The auxiliary mechanism thus may be considered a rotatable rake, the greater part of the travel of the tines thereof being useless for any displacement of the crop material.

The rotatable rake or rotary fingers or tines are driven periodically or continuously with a phase-shifted relationship with respect to the operation of the tranverse-feed mechanism which, as noted, is shifted out of phase with respect to the motion of the compression ram. Since the rotatable rake is effective only in the lowermost portions of the rack tines, the auxiliary mechanism provides insufficient guidance for the crop material overshooting the pickup drum and the system is not capable of providing any pre-compaction within the feed trough as is desirable for efficient operation of the tranverse-feed mechanism and the press ram. Furthermore, sudden increases in the pickup of the crop, resulting from nonuniform swath formation, may result in jamming or clogging of the pickup and auxiliary devices.

OBJECTS OF THE INVENTION

It is the principal object of the present invention to provide an improved crop-feed mechanism for a hay baler whereby the aforementioned disadvantages can be obviated.

It is still another object of the invention to provide a hay baler having an improved crop-feed mechanism which provides a high degree of pre-compaction and more efficient advance of crop material than has been obtained heretofore.

SUMMARY OF THE INVENTION

The foregoing objects and others which will become apparent hereinafter are attained, in accordance with the present invention, in a crop-feed arrangement for a hay baler displaceable along a swath of a field crop and which comprises, in addition to a pickup drum rotatable about an axis transverse to the direction of displacement of the body of the baler, an auxiliary feed device above the pickup drum which is angularly oscillatable for pushing the crop material into a transverse-feed trough and having a longer duty cycle (ratio of effective crop advance time to the period of oscillation or to the return time) and therefore a faster return time than feed time.

The basic baler structure may have the configuration described earlier, i.e. can include a housing or a chassis displaceable on wheels along the ground and towed by a tractor or other vehicle, although a self-propelled arrangement need not be excluded.

The chassis or housing is provided (preferably at one side) with a rearwardly extending press channel or baling chamber in which the ram or plunger of the baler is reciprocal by a drive means connected to a prime mover on the implement chassis (e.g. an engine) or to the power takeoff of the towing tractor, for compaction of crop material within this channel against a previously formed bale therewithin or against the retarding forces of friction between the crop material and the channel wall. The baling channel is generally provided, in addition, with baling needles or the like adapted to sling baling twine or wire around the bale during its formation and a knotting mechanism for tieing the cord or wire around the bale. The mechanism for slinging the twine or wire around the bale for knotting the ties and even the ram may be of conventional construction well known per se.

According to a feature of the invention, the press channel is provided with a lateral opening communicating with a transverse-feed trough which may extend the full width of the swath at the throat of the intake portion of the housing in which the pickup drum is disposed. The transverse-feed trough thus extends transversely (generally horizontally) to the direction of displacement of the implement and generally perpendicularly to the press channel, but parallel to the axis of the pickup drum. A transverse-feed mechanism, also known per se, may be displaceable along the feed trough to carry to gathered crop material into the press channel through the aforementioned opening. While any conventional transverse-feed mechanism, e.g. auger, belt or plunger, may be used for this purpose, it is preferred to employ a plurality of forks swingable in a swingable in a circular or elliptical pattern of movement in a substantially vertical plane parallel to the axis of the pickup drum and perpendicular to the press channel for sweeping the crop material along the trough and lifting it into the press channel through the opening therein.

According to the invention, the pickup drum, having a generally horizontal axis formed along its periphery with a multiplicity of outwardly projecting angularly and axially spaced tines or fingers, is journaled in the throat of the implement and is driven, e.g. by the power takeoff, the prime mover, or the wheels of the implement via a transmission system synchronizing the transverse-feed forks, the ram and the pickup drum, to lift crop material from the ground toward the transverse-feed trough, parallel to which the drum extends. The auxiliary feed device has the function of providing a substantially positive advance of the crop material from above the drum into the transverse-feed channel and thus also applies a precompression to the crop material which is maintained or increased in the transverse-feed arrangement until the crop material enters the press channel for final compaction. Nonuniform swaths thus do not interrupt the continuous operation of the apparatus, the throughput of the apparatus is increased and overloading of the crop-feed and intake arrangments is precluded.

The oscillating plunger arrangement which constitutes the auxiliary feed device according to the present invention comprises a support pivoted in the implement housing for rotation about an axis parallel to the axis of the pickup drum, an eccentric drive and means connecting the eccentric drive to this oscillatable support. The eccentric drive is preferably a crankshaft and the plunger arrangement may comprise a plurality of geometrically similar similar plunger bodies mounted upon the support or entrained thereby and axially spaced apart transverse to the direction of displacement of the implement. The dimensions of these individual plungers or arms, the arrangement of the pivotal mechanism and the eccentric are so selected that the forward stroke of the plungers in the direction of the transverse feed channel is slower than the rearward or return stroke. The individual oscillating pushers or plungers may be provided with means for preventing overloading or straining of the arms and thus can be yieldably mounted upon the support.

DESCRIPTION OF THE DRAWING

The above and other objects, features, and advantages will become apparent from the following description, reference being made to the accompanying drawing in which:

FIG. 10 is a detail view, in perspective, of a portion of the device of FIGS. 3–7.

SPECIFIC DESCRIPTION

Figure 1:
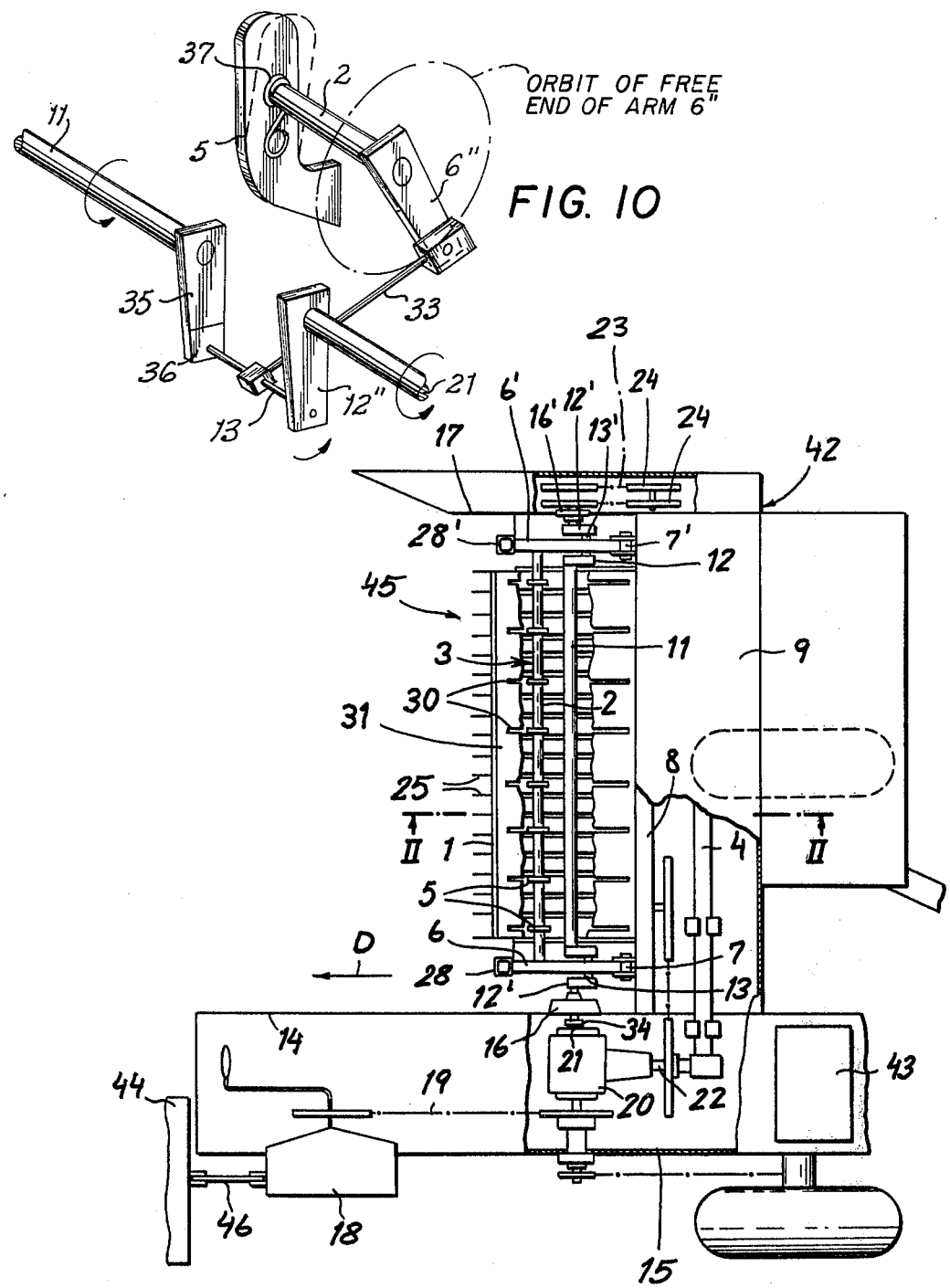
FIG. 1 is a top-plan view of a first embodiment of the apparatus according to the present invention.
Figure 2:
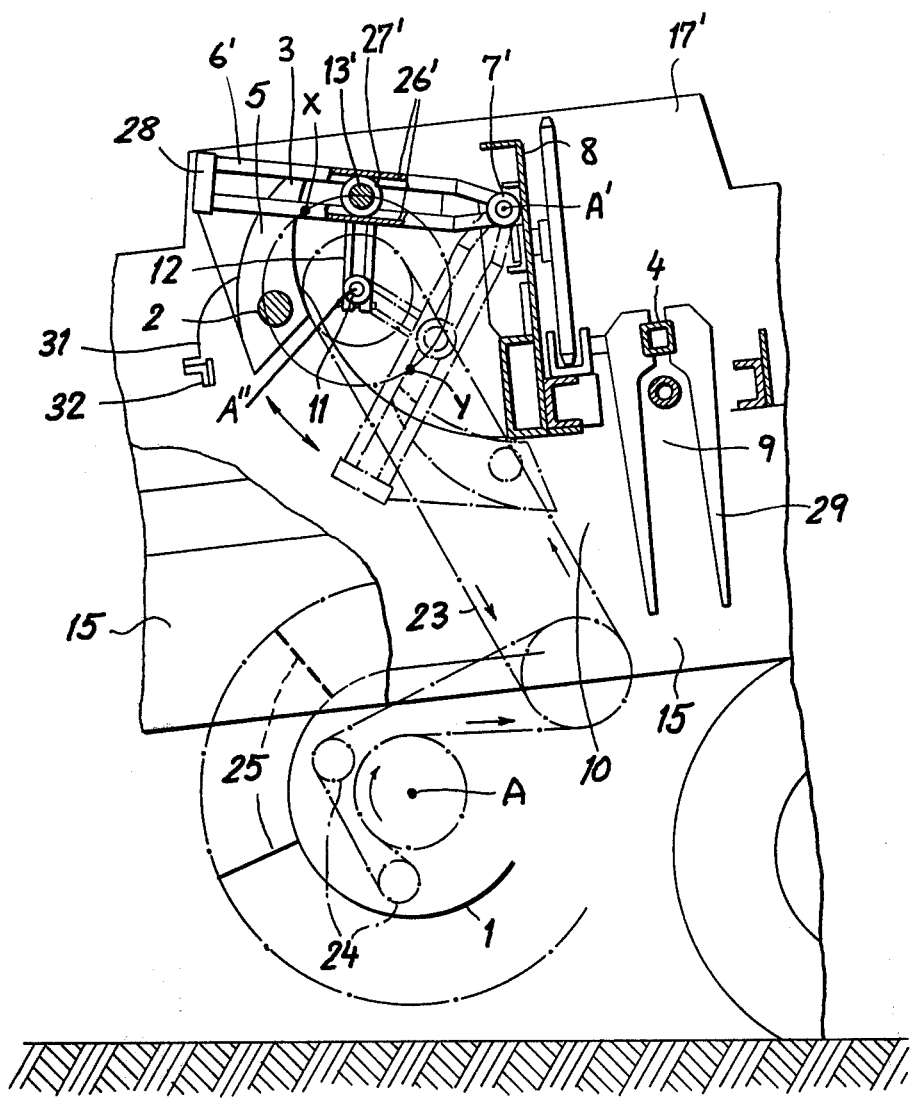
FIG. 2 is a side-sectional view taken along line II—II of FIG. 1, drawn to an enlarged scale.
Figure 3:
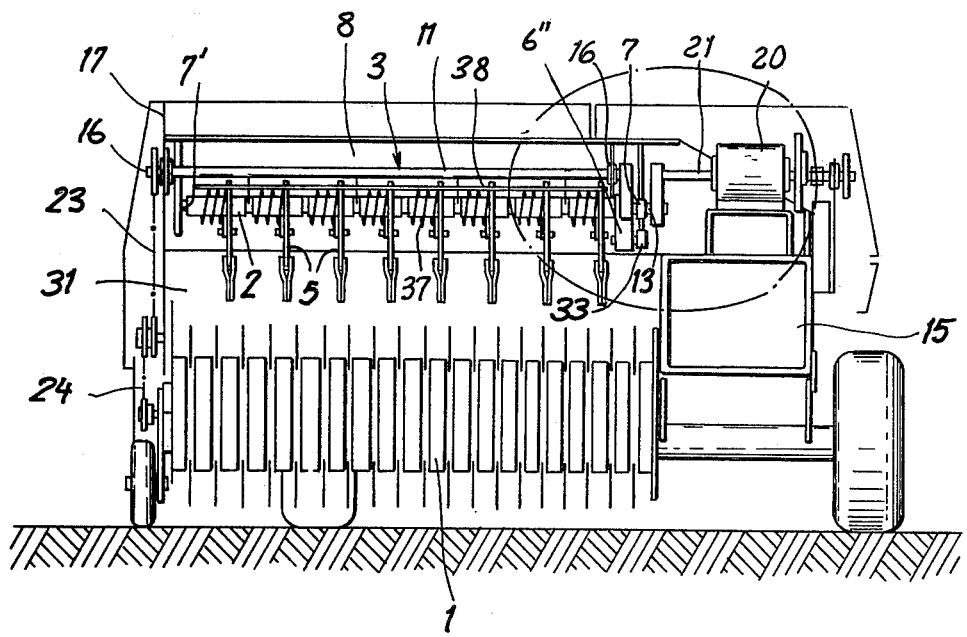
FIG. 3 is a front view of a second embodiment of the apparatus according to the present invention.
Figure 4:
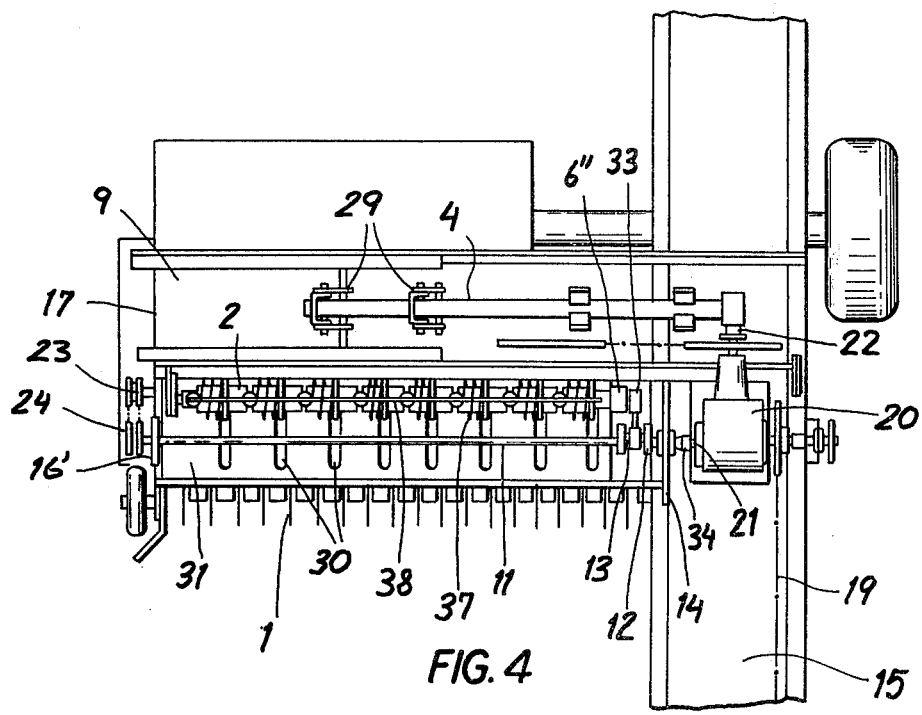
FIG. 4 is a top view of the apparatus shown in FIG. 3.
Figure 5:
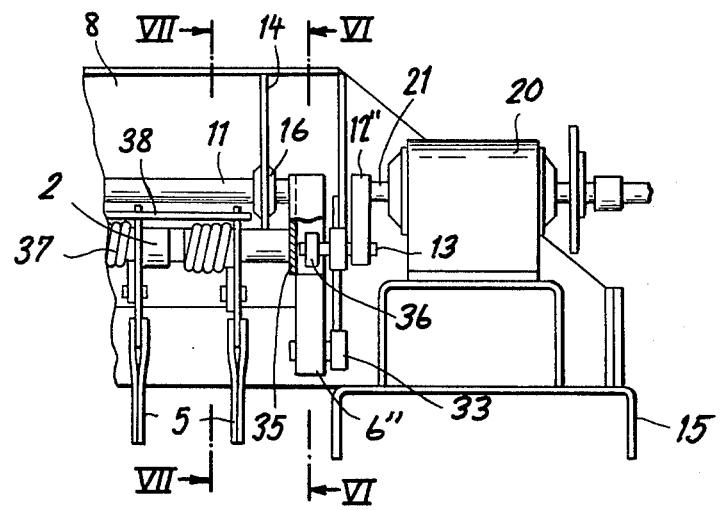
FIG. 5 is an actual view of, in an enlarged scale, of the portion of the device shown by circle V in FIG. 3 but in an enlarged scale.

As shown in FIGS. 1 and 2 the apparatus according to the present invention has a housing 42 adapted to ride along the ground behind a tractor 44 in a transport direction D. The housing has an outrigger arm 17 defining a forwardly open throat 45 in which a pickup drum 1 having tines 25 is rotatable about a transverse axis A (FIG. 2).

Above and in back of the drum 1 there is a pusher unit 3 which, as will be described below, picks crop material from between the tines 25 and pushes it back through an opening 10 into a transverse trough or channel 9 whose end opens into a baling chamber 15. A transverse feeder 4 in the trough 9 advances the crop into the chamber 15 where it is formed into tied-up bales by a mechanism 43 known per se, therefore, shown diagramatically is a block. The transverse feed 4 comprises at least one fork (FIG. 2) having a plurality of teeth or tines 29 which describe a linear, elliptical, kidney-shaped or circular path in the lower arc of which they move toward the chamber 15 so as to push the crop in that direction (see U.S. Pat. No. 3,351,002).

The pusher unit 3 comprises a plurality of equispaced sheet-metal blades 5 each having a hub through which a shaft 2 parallel to the drum axis passes. A shaft 11 also extends parallel to the axis A, and therefore lies perpendicular to the transport direction D and parallel to the trough 9. At each end the shaft 11 is provided with a crank arm 12 connected to another parallel crank arm 12' by respective pins 13 and 13' parallel to the shaft 12. At one end the arm 12' is pivoted in a bearing 16' in the wall of the outrigger arm 17 and the other end in a bearing 16 in the wall 14 of the chamber 15.

The tractor 44 has a power takeoff 46 connected to a first transmission 18 connected in turn through a chain 19 to a second transmission 20 having a first output shaft 21 connected through the bearing 16 to one end of the crankshaft 11 and a second output shaft 22 that is coupled with the transverse feed 4. The other end of the shaft 11 is connected via chain 23 and drive wheels 24 to the drum 1 so as to rotate this element also, in a clockwise direction as shown in FIG. 2. The shaft 11 simultaneously is rotated in a counter-clockwise direction.

The crankpins 13 and 13' are removable and each carry a roller 27' which rides in a track 26 formed in respective arms 6 and 6' which are pivoted in respective bearings 7 and 7' about a common axis A' above and behind the shaft 11 and about directly above the opening 10. The ends of the arms 6 and 6' are closed by screwed-on endpieces 28 so that as the crank-shaft rotates these arms oscillate back and forth like a crank-slide. The shaft 2 is carried by arms 6 and 6' and supports the blades 5. The blades may be resiliently mounted or provided with springs as described below. A plate 31 spanning the throat 45 is formed with a plurality of slots 30 in which the blades 5 are received so that these blades will be cleared of crop on their return (clockwise oscillation) stroke. A reinforcing member 32 at the under edge of the semicylindrical plate 31 protects this element from damage. The effective ends of the blades continuously protrude through the slots 30 of plate 31, which runs parallel to the path of the blades, serving to prevent entry of crop material into the blade drive mechanism.

As the apparatus is drawn along behind the tractor 44 the tines 25 of the drum 1 pick cut or piled crop up of the ground and carry it upwardly. The oscillating blades 5, which are phase shifted by about 180° with respect to fork 29, as they move from the solid line position of FIG. 2 to the dot-dash line position pick the crop out from between the tines or move at the speed thereof and assist in moving the crop material back toward the opening 10, hence into the channel 9. The teeth 29 entrain the crop along the channel and into the chamber 15 where it is formed into bales. Plate 31 is mounted upon the longitudinal support 8 for the transverse-feed mechanism and upon the frame member 32 of the housing.

Since the crankpins 13 and 13' lie between the axis A' and the pusher blades 5, these blades will be displaced more rapidly on their return stroke than on their working stroke. Taking two diametrically opposite points X and Y on the orbit of the pin 13' as an example, it should be clear that on counterclockwise rotating of pin 13 from point X to Y the pin lies between the axis A'' of the shaft 11 and the axis A', so that the arm 6' is being operated as a third-class lever for the return stroke. As the pin rotates from point Y to point X, however, the lever arm is shorter, since fulcrum is moved considerably toward the working end of the lever. Thus the arm 6' will move more slowly during the downward working stroke than during the upward return stroke, here only half as fast. In this manner, the crop is less likely to be damaged. The pushers 5 have the configurations of cornicopias with the base forming the active face and lying in a plane parallel to the axis A' and A''. In their lower dead center positions, the blades 5 have a height (seen in side view) which is approximately half that of the opening 10 and overlies half this opening. The tapered leading end projects in this position into trough 9 (see FIG. 2, dot-dash lines.).

Figure 6:
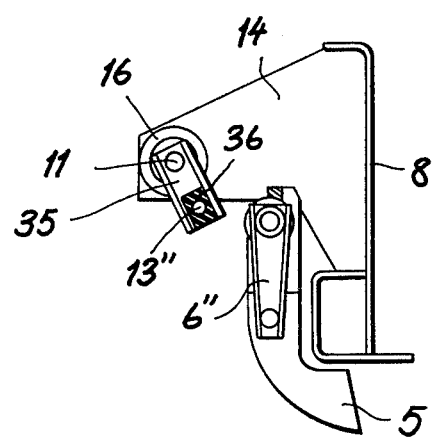
FIG. 6 is a section taken along line VI—VI of FIG. 5.
Figure 7:
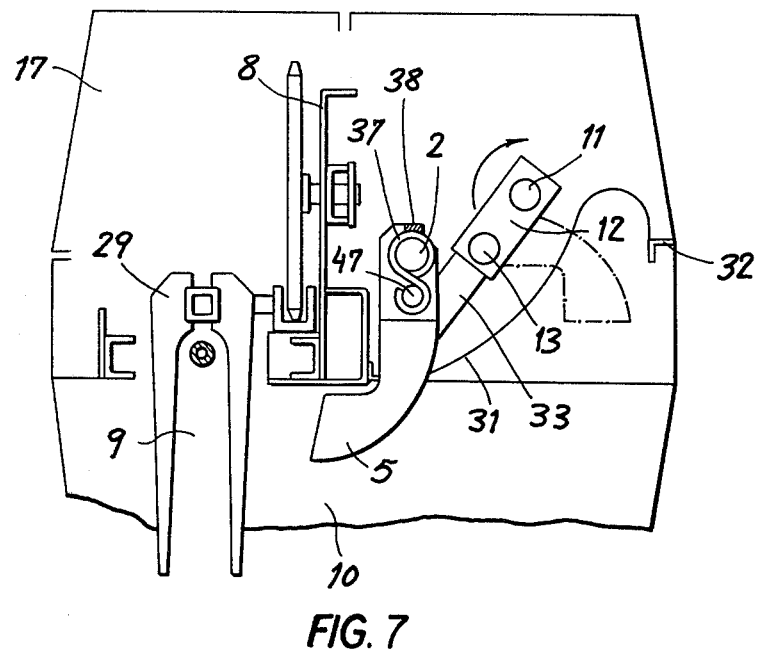
FIG. 7 is a section taken along line VII—VII of FIG. 5.

The embodiment of FIGS. 3-7 is substantially identical to that of FIGS. 1 and 2, except as noted below and that the shaft 2 is journaled at 14 to the housing and the arms 6'' are not functionally identical elements bearing the same reference numerals. Here the blades 5 are rotatable on the shaft 2 although axially nondisplaceable thereon. A respective torsion spring 37 is anchored at 38 to the shaft 2 and is anchored at 47 to each blade 5. The springs 37 are heavily preloaded to resist displacement of the blades 5 back counterclockwise as shown in FIG. 7. In this manner should one of the blades 5 come against a substantial obstruction, such as a wad of crop or a stone, it will merely deflect rearwardly and will therefore not break. The force applied to the obstructing wad of crop material, however, increases as the spring is increasingly loaded.

The arms 6'' are fixed at one end of the shaft 2 and at their other end are linked via a connecting rod 33 to the pin 13 which here is fixed on a crank arm 12'' carried on the output shaft 21 of the transmission 20. This pin carries on its end an elastomeric body 36 which is loosely received in a channel-like crank arm 35 which serves to rotate the shaft 11. The other end of this shaft serves to drive drum 1 as described above with reference to FIGS. 1 and 2.

Figures 8, 9:
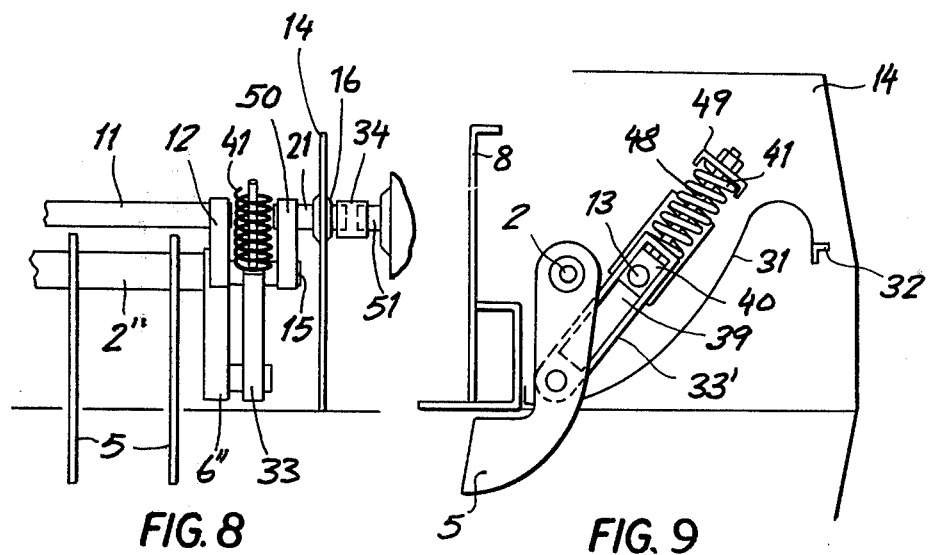
FIG. 8 is a view similar to FIG. 5 illustrating a third embodiment of the present invention.
FIG. 9 is a view similar to FIG. 6 showing the third embodiment.

The embodiment of FIGS. 8 and 9 is similar to that of FIGS. 3-7, except that here the blades 5 are fixed on the shaft 2 and the pin 13 is connected to them through a compressible link 33'. The pin 13 passes through a block 40 from which a rod 48 bearing a cap 49 extends. A compression spring 41 is compressed between this cap 49 and the end of the link 33', which is cut out at 39 to be able to slide on the block 40. Thus, if any of the blades 5 meets a substantial obstruction the spring 41 will be compressed and the blades 5 will not fully continue in their working stroke, avoiding damage to the device. In addition, the shaft 11 here is above the shaft 2 to obtain maximum deflection of the blades 5.

In FIG. 8 the output shaft 21 is splined and connected through an internally splined sleeve 34 to a shaft 51 carrying a crank arm 50 carrying the pin 13 and connected to a crank arm 12 as in FIGS. 1 and 2. Such an embodiment is substantially less expensive to make while still providing for deflection of the blades when something is picked up that is too hard.

In all embodiments the oscillation frequency of the unit 3 is the same as the period of revolution of the feed teeth 29, and the end of the working stroke of the unit 3 is made to coincide with the uppermost position of these teeth 29 so that the blades 5 and teeth 5 do not come into contact with each other. Of course the rotation rate of teeth 29 could be a multiple of the oscillation stroke of the pusher blades 5, so long as the two are kept out of contact with each other.

Each blade 5 has a face 5' which is substantially half as high as the opening 10, and which in the lowermost position of the blade, as shown in FIG. 6, is inclined to the vertical, extending slightly into the trough 9 with its lower corner.

We claim:
1. A baling apparatus comprising:
 a housing displaceable along the ground in a travel direction;
 a pickup drum at the front of said housing and rotatable about an axis transverse to said direction;

a channel member extending transverse to said direction in back of said drum;

a baling chamber on said housing at one end of said channel member;

drive means on said housing operatively connected to said drum for rotating said drum and thereby lifting crop off the ground and displacing the crop back toward said channel member;

an oscillatable member on said housing extending transversely to said direction above and between said drum and said channel member;

a plurality of pusher elements on said member displaceable from said drum to said channel member;

eccentric means operable by said drive means and coupling means connecting said eccentric means to said oscillatable member for oscillating said elements at a relatively slow rate to displace said crop from said drum into said channel member and at a relatively rapid rate away from said channel member, said coupling means including a pair of arms pivoted on said housing at one end and each connected at their other end to said oscillatable member, and a crank connected to said oscillatable member, said eccentric means including a crankshaft lying intermediate the ends of said arms and rotatable in such direction that said crank lies between said crankshaft and said oscillatable member during oscillation of said elements toward said channel member and said crankshaft lies between said crank and said oscillatable member during oscillation of said elements back from said channel member;

means on said housing in said channel member for displacing crop therealong into said chamber;

means in said chamber for forming bales of said crop; and means including at least one spring interposed between said elements and said crankshaft whereby said elements can be restrained from motion without stopping said crankshaft, said drum being provided with a plurality of tines, said elements being engageable between said tines.

2. The apparatus defined in claim 1 wherein each of said elements is connected to said member by one such spring.

3. The apparatus defined in claim 2 wherein said member is a shaft and said elements are limitedly rotatable on said shaft, said springs each being a torsion spring having one end engaged in said shaft and another end engaging the respective element.

4. The apparatus defined in claim 1 wherein said drive means is provided with a first crank arm and said crankshaft is provided with a second crank arm, said apparatus further comprising an elastomeric body carried on one of said crank arms and engaging the other arm in loose force-transmitting relationship.

5. The apparatus defined in claim 4 wherein the other of said arms is formed at least partially as a channel loosely receiving said body.

* * * * *